United States Patent
Tokgoz et al.

(10) Patent No.: US 10,715,208 B2
(45) Date of Patent: Jul. 14, 2020

(54) INTERFERENCE MITIGATION IN WIRELESS COMMUNICATIONS

(71) Applicant: QUALCOMM Incorporated, San Diego, CA (US)

(72) Inventors: Yeliz Tokgoz, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/144,381

(22) Filed: Sep. 27, 2018

(65) Prior Publication Data
US 2019/0132023 A1    May 2, 2019

Related U.S. Application Data

(60) Provisional application No. 62/577,622, filed on Oct. 26, 2017.

(51) Int. Cl.
*H04W 4/00* (2018.01)
*H04B 1/711* (2011.01)
(Continued)

(52) U.S. Cl.
CPC ............ *H04B 1/711* (2013.01); *H04W 16/14* (2013.01); *H04W 72/082* (2013.01);
(Continued)

(58) Field of Classification Search
CPC ............ H04B 1/711; H04B 2001/1045; H04L 5/0007; H04W 16/14; H04W 72/082; H04W 74/002; H04W 74/0816
See application file for complete search history.

(56) References Cited

U.S. PATENT DOCUMENTS

2007/0081489 A1 * 4/2007 Anderson ............. H04W 16/14
                                                        370/329
2014/0105136 A1   4/2014 Tellado et al.
(Continued)

FOREIGN PATENT DOCUMENTS

EP       1946575 A1    7/2008
WO    2014079310 A1    5/2014
WO    2018082580 A1    5/2018

OTHER PUBLICATIONS

Huawei et al., "Overview of NR UL for LTE-NR Coexistence", 3GPP Draft; R1-1709979, 3rd Generation Partnership Project (3GPP), Mobile Competence Centre ; 650, Route Des Lucioles ; F-06921 Sophia-Antipolis Cedex; France, vol. RAN WG1, No. Qingdao, China, Jun. 17, 2017 (Jun. 17, 2017), XP051304719, Retrieved from the Internet: URL:http://www.3gpp.org/ftp/tsg_ran/WG1_RL1/TSGR1_AH/NR_AH_1706/Docs/, 12 pages.

(Continued)

*Primary Examiner* — Minh Trang T Nguyen
(74) *Attorney, Agent, or Firm* — Patterson + Sheridan, LLP

(57) ABSTRACT

Certain aspects of the present disclosure provide techniques for interference mitigation. Certain aspects provide a method for wireless communication. The method generally includes performing communications, in a first channel, on a first downlink in a first time period based on communications in a second channel adjacent to the first channel being performed on a second downlink in the first time period. Communications in the first channel on a first uplink are performed in a second time period based on communication in the second channel being performed on a second uplink in the second time period. The method further includes refraining from communicating in the first channel on one or more resources in the first time period or the (Continued)

second time period to mitigate cross-link interference with a third channel adjacent to the first channel.

29 Claims, 13 Drawing Sheets

(51) Int. Cl.
*H04W 16/14* (2009.01)
*H04W 72/08* (2009.01)
*H04W 74/00* (2009.01)
*H04W 74/08* (2009.01)
*H04B 1/10* (2006.01)
*H04L 5/00* (2006.01)

(52) U.S. Cl.
CPC ..... *H04W 74/002* (2013.01); *H04W 74/0816* (2013.01); *H04B 2001/1045* (2013.01); *H04L 5/0007* (2013.01)

(56) References Cited

U.S. PATENT DOCUMENTS

| | | |
|---|---|---|
| 2017/0257774 A1 | 9/2017 | Ghosh et al. |
| 2018/0070369 A1* | 3/2018 | Papasakellariou .... H04L 5/0094 |
| 2018/0131499 A1 | 5/2018 | Zhang et al. |
| 2018/0132278 A1 | 5/2018 | Oteri et al. |

OTHER PUBLICATIONS

International Search Report and Written Opinion—PCT/US2018/053355—ISA/EPO—dated Dec. 12, 2018.

LG Electronics: "Discussion on NR-LTE Coexistence for DL Transmission", 3GPP Draft, R1-1704938 NR-LTE Coexistence DL, 3rd Generation Partnership Project (3GPP), Mobile Competence Centre, 650, Route Des Lucioles, 7-06921 Sophia-Antipolis Cedex, France vol. RAN WG1, No. Spokane, USA, Apr. 3, 2017-Apr. 7, 2017, Apr. 2, 2017 (Apr. 2, 2017), XP051243072, 4 Pages, Retrieved from the Internet: URL:http://www.3gpp.org/ftp/Meetings_3GPP_SYNC/RAN1/Docs/ [retrieved on Apr. 2, 2017].

Samsung: "LTE-NR Coexistence for UL", 3GPP Draft, R1-1708062 LTE-NR Coexistence for UL-Samsung, 3rd Generation Partnership Project (3GPP), Mobile Competence Centre, 650, Route Des Lucioles, F-06921 Sophia-Cedex, France vol. RAN WG1, No. Hangzhou, China, May 15, 2017-May 19, 2017, May 4, 2017 (May 4, 2017), XP051261264, pp. 1-8, Retrieved from the Internet: URL:http://www.3gpp.org/ftp/tsg_ran/WG1_RL1/TSGR1_89/Docs/ [retrieved on May 4, 2017].

* cited by examiner

1200

1202

PERFORM COMMUNICATIONS IN A FIRST CHANNEL, WHEREIN THE FIRST CHANNEL IS ADJACENT TO A GUARD BAND, WHEREIN THE GUARD BAND IS ADJACENT TO A SECOND CHANNEL USED FOR LTE COMMUNICATION, WHEREIN THE FIRST CHANNEL IS FURTHER ADJACENT TO A THIRD CHANNEL USED FOR NR COMMUNICATION, WHEREIN COMMUNICATIONS IN THE FIRST CHANNEL IS RESTRICTED TO MITIGATE CROSS-LINK INTERFERENCE BETWEEN THE FIRST CHANNEL AND THE SECOND CHANNEL, WHEREIN RESTRICTING COMMUNICATIONS IN THE FIRST CHANNEL COMPRISES ONE OR MORE OF LIMITING A BANDWIDTH OF THE FIRST CHANNEL, USING A SHARP TRANSMIT FILTER, USING A SHARP RECEIVE FILTER, LIMITING TRANSMIT POWER, OR LIMITING ANTENNA HEIGHT

FIG. 12

INTERFERENCE MITIGATION IN WIRELESS COMMUNICATIONS

CROSS-REFERENCE TO RELATED APPLICATIONS

This application claims the benefit of U.S. Provisional Patent No. 62/577,622, filed Oct. 26, 2017. The content of the provisional application is hereby incorporated by reference in its entirety.

INTRODUCTION

Aspects of the present disclosure relate to wireless communications, and more particularly, to techniques for interference mitigation.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes performing communications, in a first channel, on a first downlink in a first time period based on communications in a second channel adjacent to the first channel being performed on a second downlink in the first time period. Communications in the first channel on a first uplink are performed in a second time period based on communication in the second channel being performed on a second uplink in the second time period. The method further includes refraining from communicating in the first channel on one or more resources in the first time period or the second time period to mitigate cross-link interference with a third channel adjacent to the first channel.

Certain aspects provide a method for wireless communication. The method generally includes performing communications in a first channel, wherein the first channel is adjacent to a guard band, wherein the guard band is adjacent to a second channel used for LTE communication, wherein the first channel is further adjacent to a third channel used for NR communication, wherein communications in the first channel is restricted to mitigate cross-link interference between the first channel and the second channel, wherein restricting communications in the first channel comprises one or more of limiting a bandwidth of the first channel, using a sharp transmit filter, using a sharp receive filter, limiting transmit power, or limiting antenna height.

Certain aspects provide a wireless communication device. The wireless communication device includes a memory and a processor. The processor is configured to perform communications, in a first channel, on a first downlink in a first time period based on communications in a second channel adjacent to the first channel being performed on a second downlink in the first time period, wherein communications in the first channel on a first uplink are performed in a second time period based on communication in the second channel being performed on a second uplink in the second time period. The processor is further configured to refrain from communicating in the first channel on one or more resources in the first time period or the second time period to mitigate cross-link interference with a third channel adjacent to the first channel.

Certain aspects provide a wireless communication device. The wireless communication device includes means for performing communications, in a first channel, on a first downlink in a first time period based on communications in a second channel adjacent to the first channel being performed on a second downlink in the first time period, wherein communications in the first channel on a first uplink are performed in a second time period based on communication in the second channel being performed on a second uplink in the second time period. The wireless communication device further includes means for refraining from communicating in the first channel on one or more resources in the first time period or the second time period to mitigate cross-link interference with a third channel adjacent to the first channel.

Certain aspects provide a non-transitory computer readable storage medium that stores instructions that when executed by a base station cause the base station to perform a method for wireless communication. The method generally includes performing communications, in a first channel, on a first downlink in a first time period based on communications in a second channel adjacent to the first channel being performed on a second downlink in the first time period. Communications in the first channel on a first uplink are performed in a second time period based on communication in the second channel being performed on a second uplink in the second time period. The method further includes refraining from communicating in the first channel on one or more resources in the first time period or the second time period to mitigate cross-link interference with a third channel adjacent to the first channel.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 12 illustrates example operations that may be performed by a wireless device for interference mitigation in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
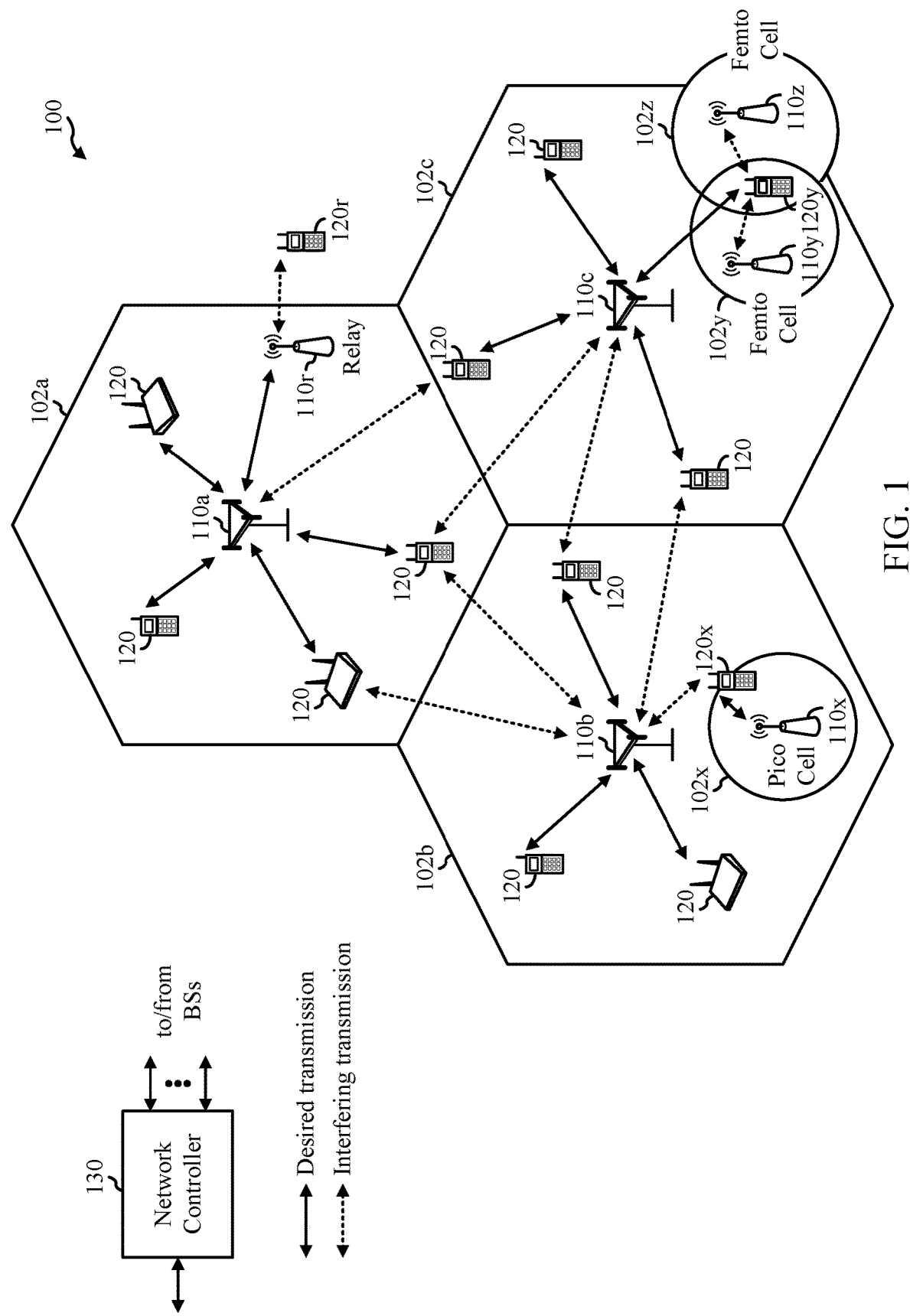
FIG. 1 is a block diagram conceptually illustrating an example telecommunications system, in accordance with certain aspects of the present disclosure.

Aspects of the present disclosure present disclosure provide apparatus, methods, processing systems, and computer readable mediums for interference mitigation, such as cross-link interference mitigation between radio access technologies (RATs) (e.g., NR and LTE).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, BSs 110 and UEs 120 may perform cross-link interference mitigation between RATs as discussed herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
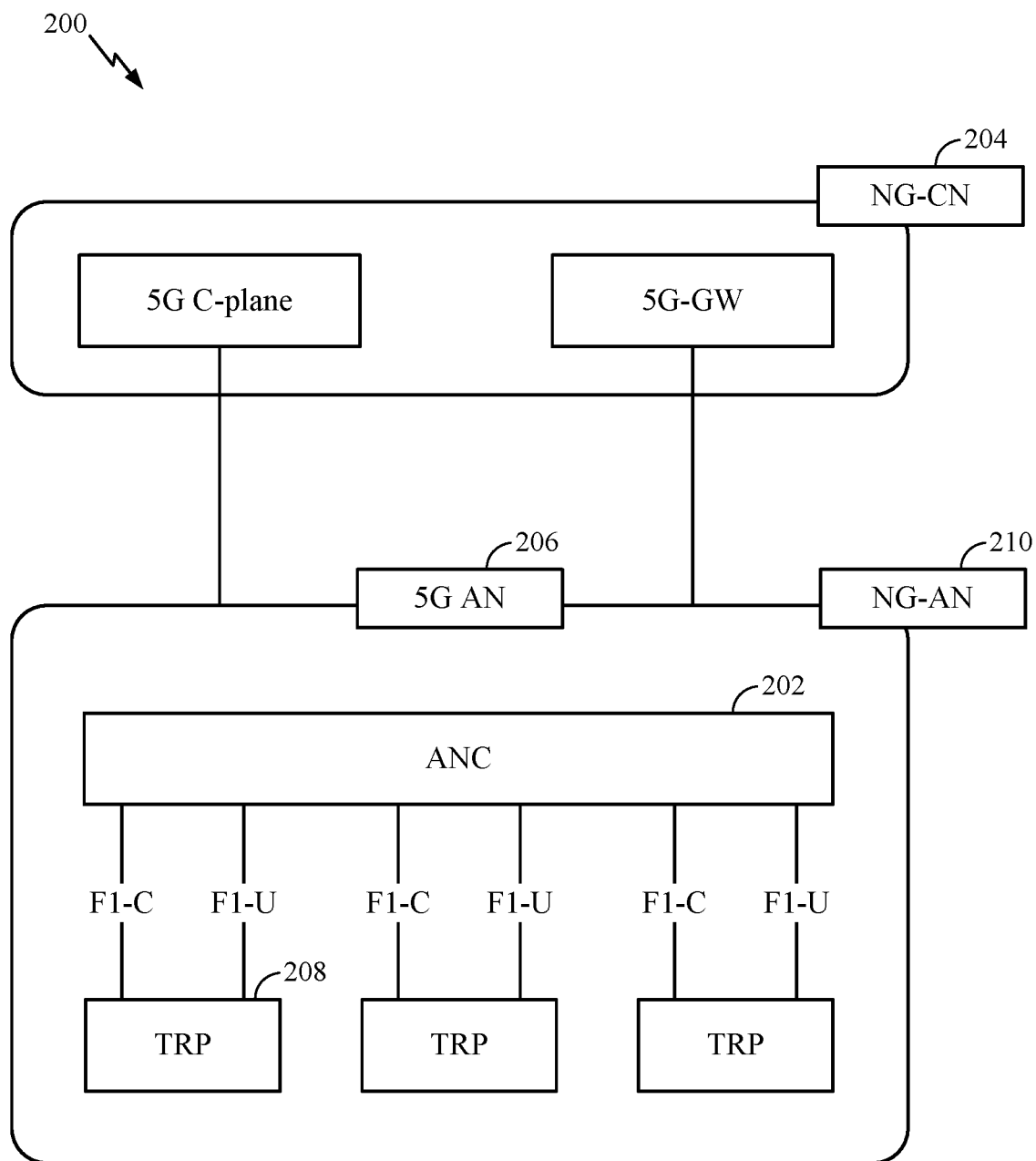
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
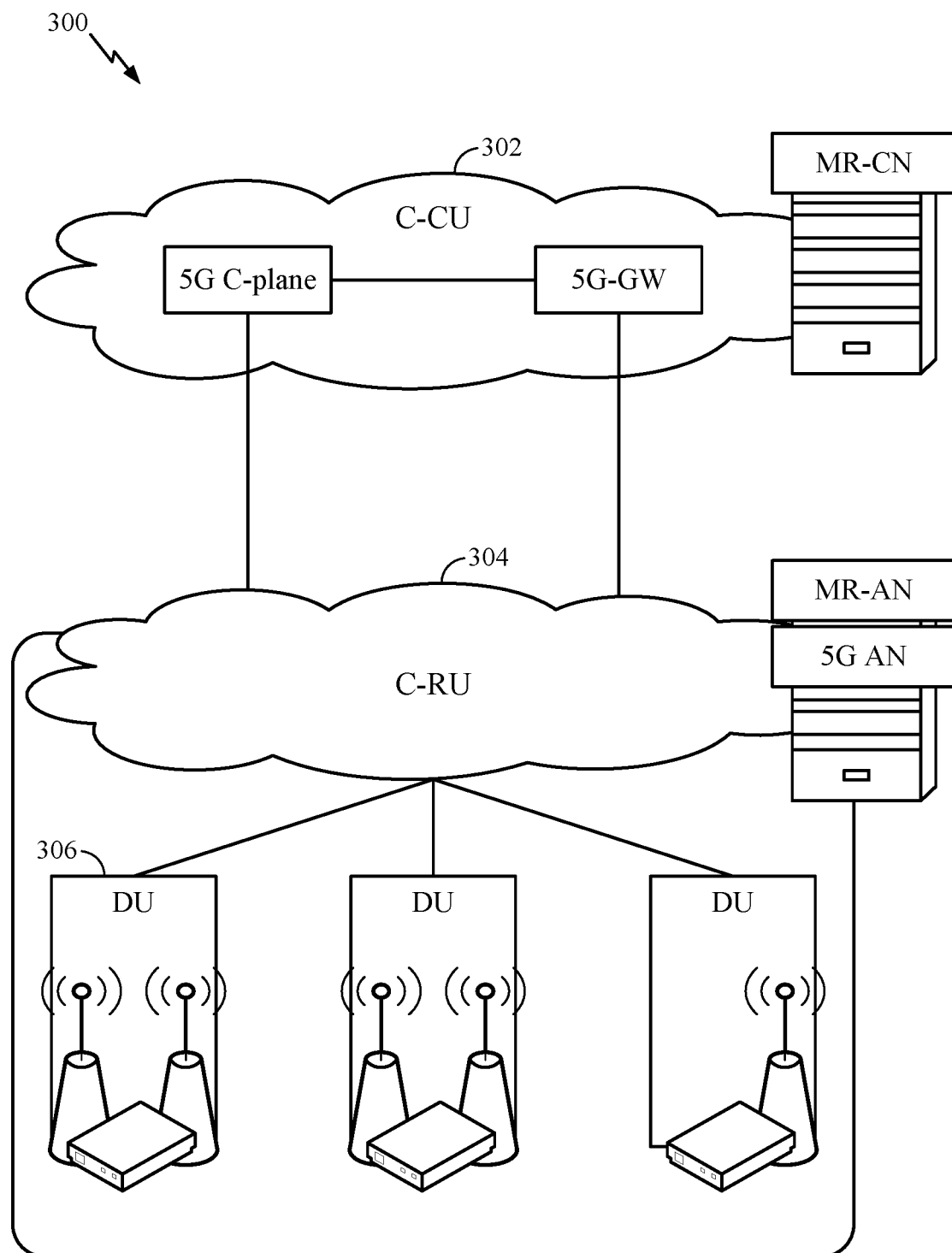
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
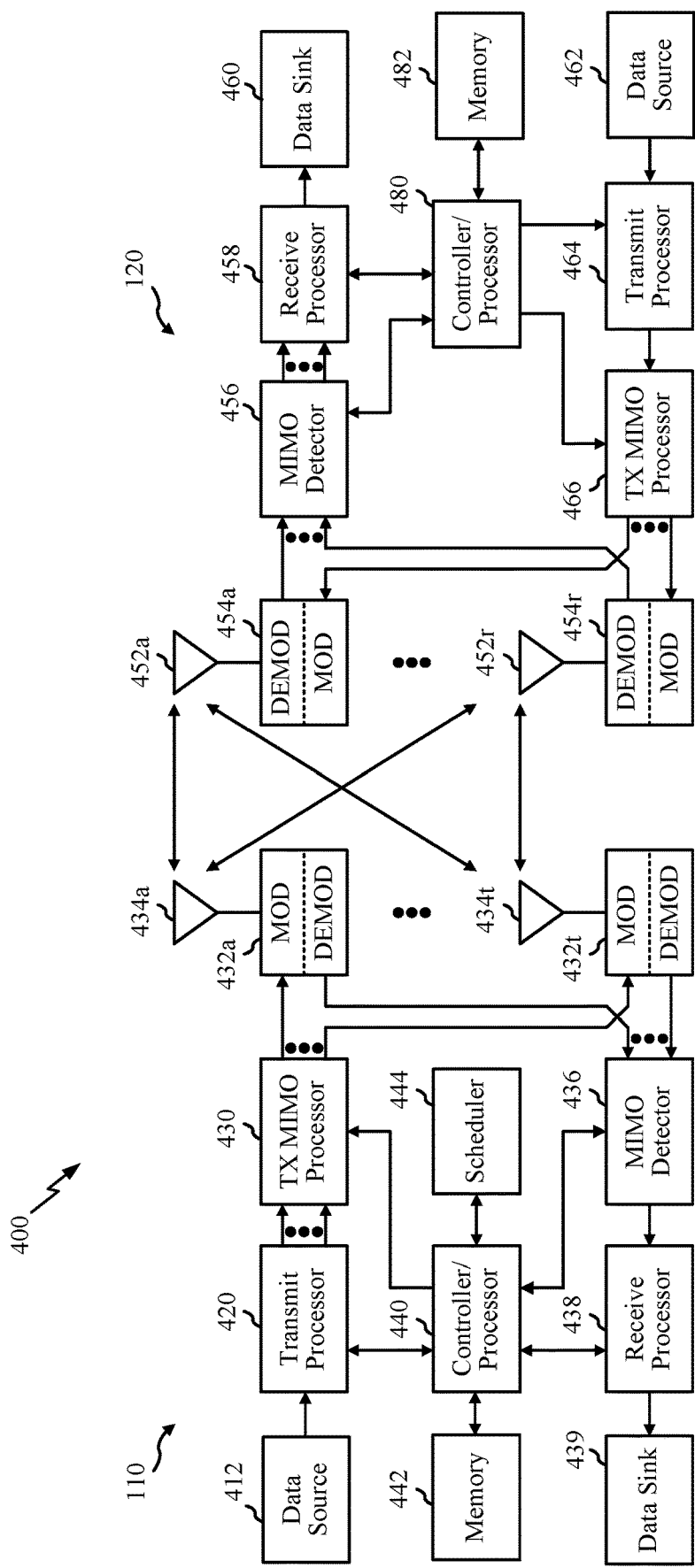
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
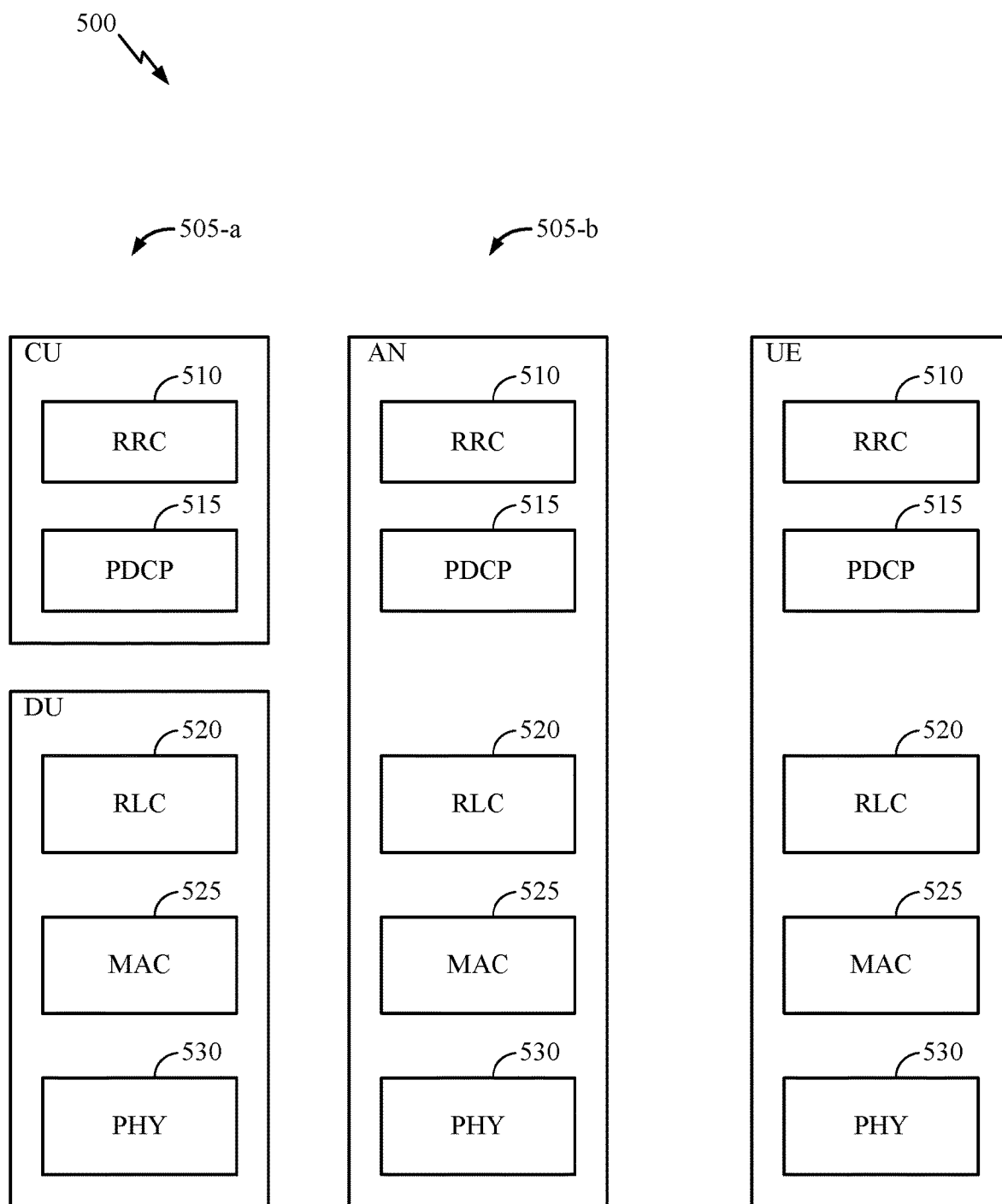
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
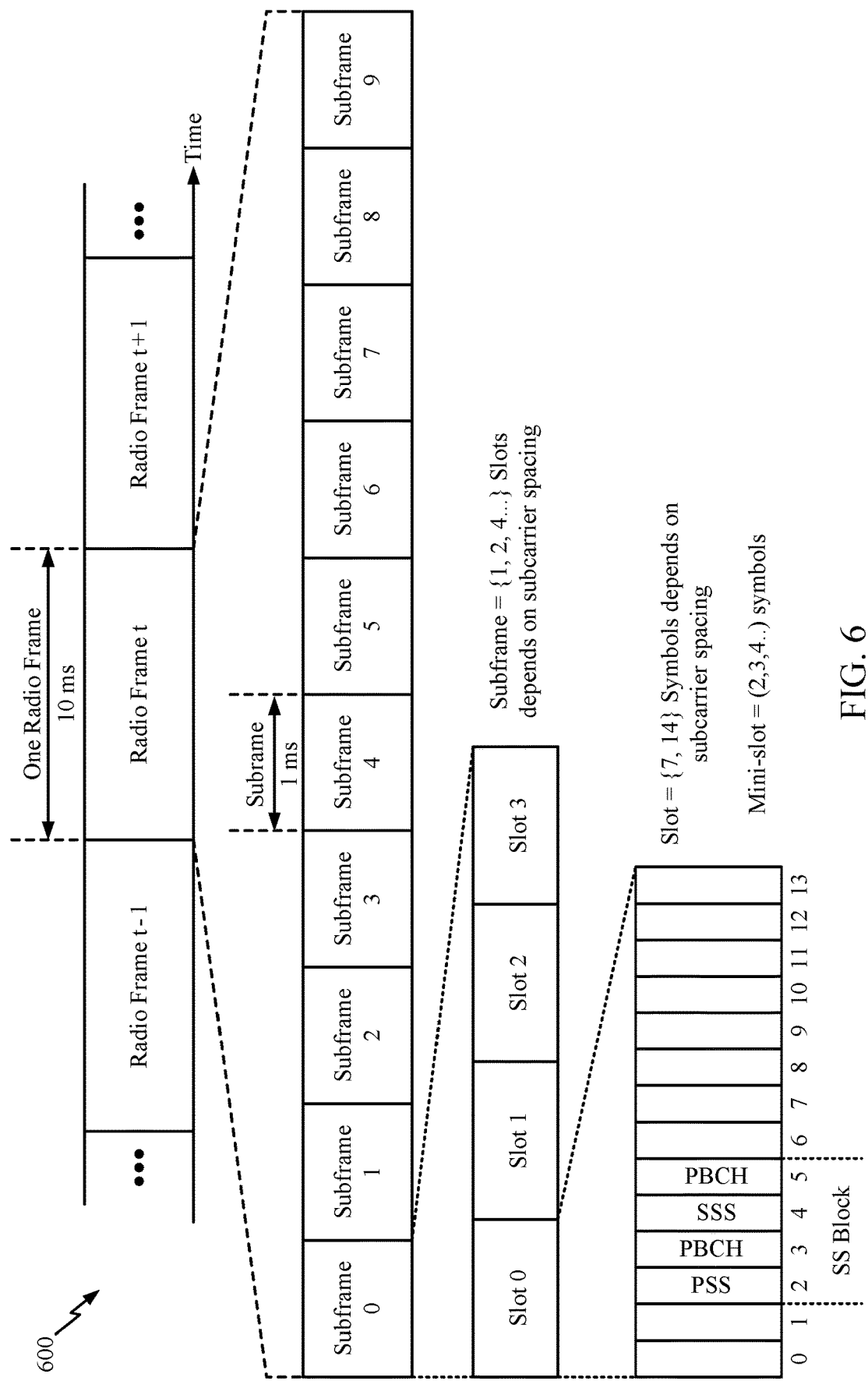
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Interference Mitigation

Figure 7A:
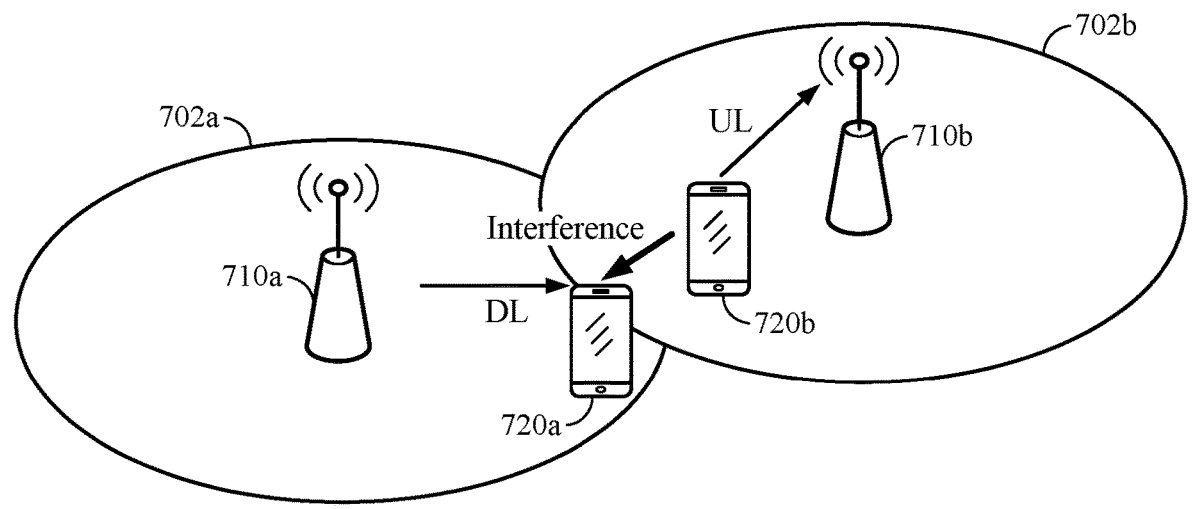
FIGS. 7A and 7B are diagrams illustrating cross-link interference that may occur in a telecommunication system, in accordance with certain aspects of the present disclosure.
Figure 7B:
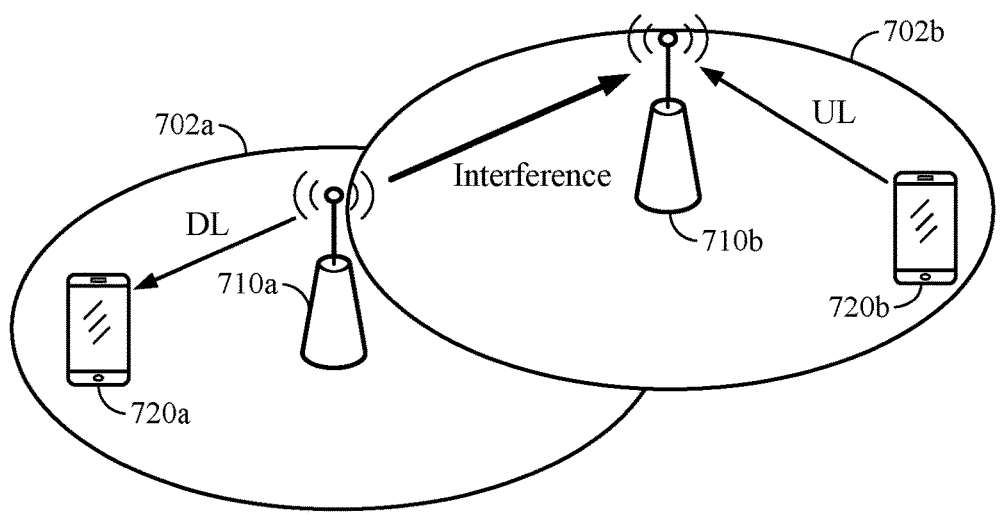

FIGS. 7A and 7B are diagrams illustrating cross-link interference that may occur in a telecommunication system.

FIGS. 7A and 7B show a first BS 710*a* (e.g., a BS 110 as shown and described in FIG. 1) with a coverage area shown by cell 702*a* and a second BS 710*b* with a coverage area shown by cell 702*b*. FIGS. 7A and 7B further show a first UE 720*a* (e.g., a UE 120 as shown and described in FIG. 1) connected to first BS 710*a* and a second UE 720*b* connected to second BS 710*b*. In certain aspects, BS 710*a* may utilize a first RAT (e.g., NR or LTE) for communication with UE 720*a*, and BS 710*b* may utilize a second RAT (e.g., the other of LTE or NR) or communication with UE 720*b*.

In certain aspects, as illustrated in FIG. 7A, UL transmissions from UE 720*b* to BS 710*b* may interfere with DL transmissions from BS 710*a* to UE 720*a* at UE 720*a*. For example, the UL transmissions in cell 702*b* may be on the same or adjacent channel(s) (e.g., frequency range(s)) of a frequency band as the DL transmissions in cell 702*a*. For example, BS 710*b* and 710*a* may be part of separate TDD deployments (e.g., separate networks such as operated by the same or different network operators) that share the same or adjacent channel(s) for DL and UL transmissions. Accordingly, the UL transmissions from UE 720*b* may be received at UE 720*a* and interfere with the DL transmissions from BS 110*a* received at UE 720*a*. Such cross-link interference between UL and DL transmissions may cause problems and poor performance.

In certain aspects, as illustrated in FIG. 7B, DL transmissions from BS 710*a* to UE 720*a* may interfere with UL transmissions from UE 720*b* to BS 710*b* at BS 710*b*. In particular, the DL transmissions from BS 710*a* may be received at BS 710*b* and interfere with the UL transmissions from UE 720*b* received at BS 710*b*. Such cross-link interference between UL and DL transmissions may cause problems and poor performance. The scenario in FIG. 7B may be more prevalent or problematic, in some cases, than the scenario in FIG. 7A since interference between BSs may be more likely to happen due to their fixed location and potential placement at high heights giving them line of sight between the BSs. Therefore, the strength of the transmissions from BS 710*a* at BS 710*b* may be high, making the interference with UL transmissions from UE 720*b* worse. Interference may not only occur in the same channel, but also across adjacent channels.

In certain aspects, to overcome such cross-link interference between UL and DL transmissions, the transmission direction (e.g., UL and DL) may be aligned between adjacent deployments (e.g., adjacent BSs 710*a* and 710*b*), meaning that both BSs 710*a* and 710*b* schedule UL transmissions at the same time and DL transmissions at the same time, so DL transmissions cannot interfere with UL transmissions. Accordingly, large guard bands are not needed between channels used for DL and UL, meaning the spectrum resources are utilized efficiently. However, the deployments of BS 710*a* and 710*b* may then be restricted from using different UL/DL configuration timings, which may impact performance as a strict configuration must always be adhered to.

In certain aspects, to overcome such cross-link interference between UL and DL transmissions, a guard band may be used between adjacent channels used for UL and DL, thereby reducing/eliminating interference between the adjacent channels even if transmissions occur at the same time. This allows for more flexible deployments of BSs, but leads to underutilization of spectrum as the guard band corresponds to portions of the frequency band not used for transmissions.

Accordingly, certain aspects herein relate to other techniques for overcoming cross-link interference that use a small or no guard band, but still allow flexible deployments.

Figure 8:
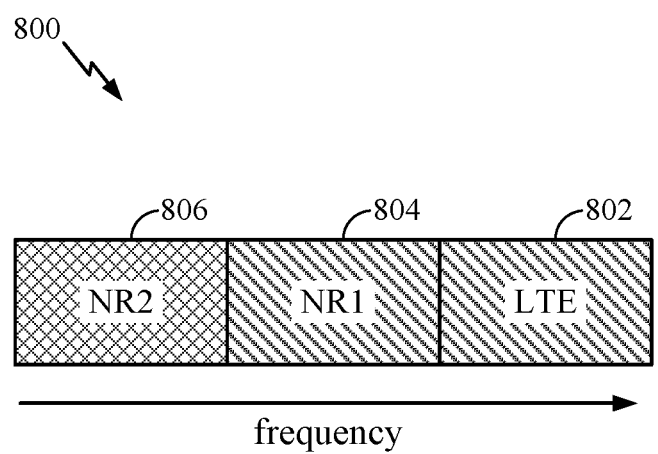
FIG. 8 illustrates adjacent channels of a frequency band for separate deployments, in accordance with certain aspects of the present disclosure.

FIG. 8 illustrates adjacent channels of a frequency band for separate deployments. For example, frequency band 800 is divided into a first channel 802, a second channel 804, and a third channel 806. The first channel 802 may be used for a first deployment (e.g., of a first network), the second channel 804 for a second deployment, and the third channel 806 for a third deployment. The first channel 802 may be for a first RAT (e.g., LTE), and the second and third channels 806 and 808 may be for a second RAT (e.g., NR). In certain aspects, different or the same RATs may be used for the channels.

In certain aspects, in order to mitigate cross-link interference between the first deployment on first channel 802 and the second deployment on second channel 804, the second deployment could align its transmission direction with the first deployment. However, in order to mitigate cross-link interference between the second deployment on second channel 804 and the third deployment on third channel 806, the third deployment would then need to align its transmission direction with the second deployment. Further deployments on adjacent channels would also need to align transmission direction, which would limit flexibility in each deployment.

Accordingly, in certain aspects, the second deployment on second channel 804 may align its transmission direction with the first channel 802, but may also blank out certain resources (i.e., not utilize certain resources for communication on the second channel 804) (e.g., resources that would conflict with the direction of the DL and/or UL control blocks containing control information for NR self-contained subframe structure). Therefore, the third deployment on third channel 806 can use the blanked out resources (e.g., for communication of DL and/or UL control information). Therefore, the second deployment may have some restricted communication configuration, but does not interfere with the first deployment, and provides flexibility to the third deployment for scheduling UL and DL transmissions. This flexibility may also extend to subsequent deployments in adjacent channels from channel 806 of the third deployment. Further, where the first deployment is LTE and the second and third deployment are NR deployments, the LTE deployment is protected from cross-link interference by the transmission direction alignment, while the third deployment and any other adjacent NR deployments have flexibility in scheduling UL and DL transmissions. In particular, NR may be designed to better deal with cross-link interference than LTE in certain aspects. Though the deployments are shown on adjacent channels, in certain aspects, some may be on the same channel.

Figure 9:
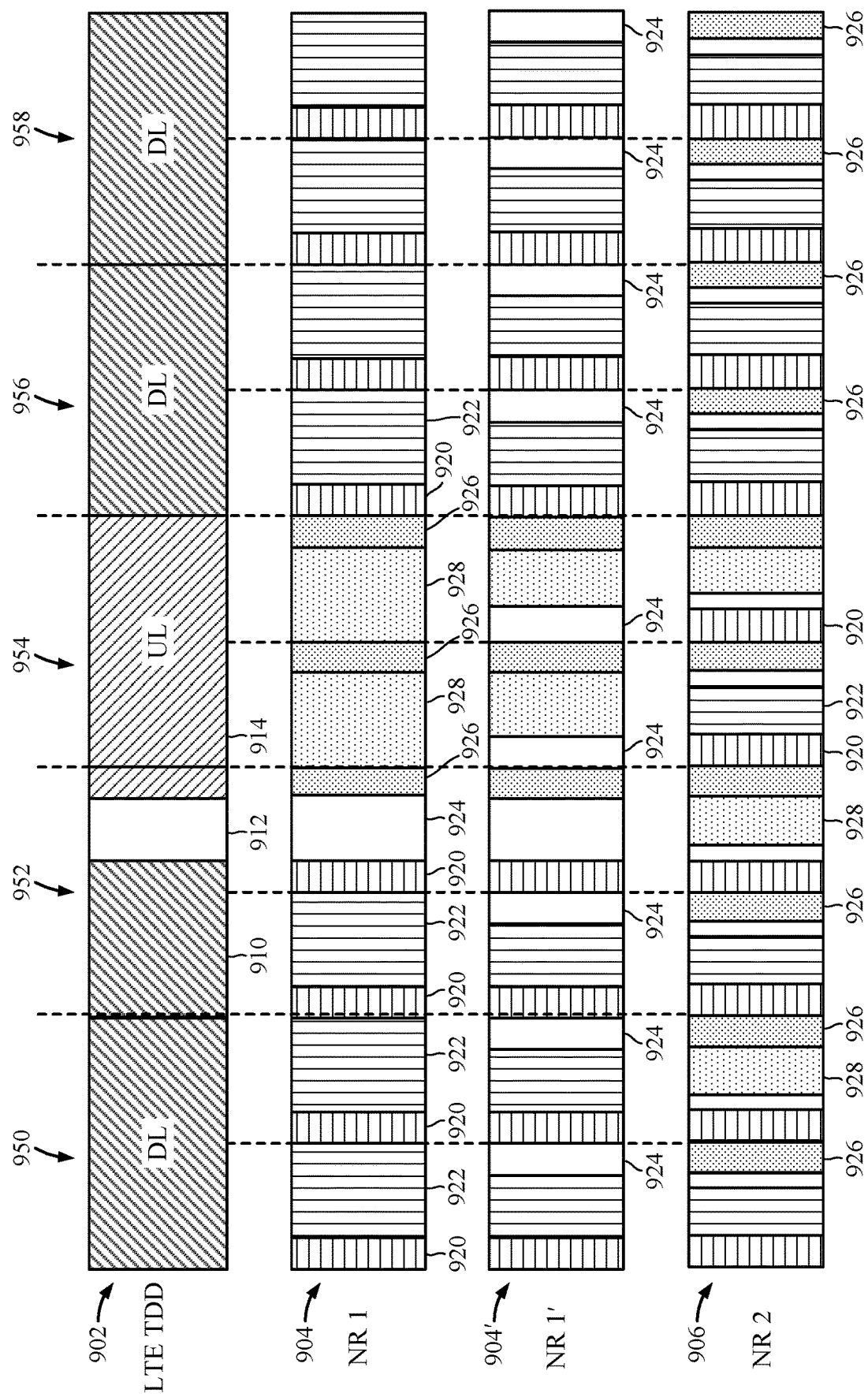
FIG. 9 illustrates communication timelines for separate deployments, in accordance with aspects of the present disclosure.

FIG. 9 illustrates communication timelines for separate deployments. As shown, a first deployment (e.g., communicating on channel 802) utilizes LTE TDD for communication as shown in timeline 902. In the first deployment, as shown in timeline 902, a first subframe 950 is used for DL communication, a second subframe 952 is used for shared UL/DL communication, a third subframe 954 is used for UL communication, a fourth subframe 956 is used for DL communication, and a fifth subframe 958 is used for DL communication. As shown, in second subframe 952, a first set of resources (e.g., time resources) 910 is used for DL communication, a second set of resources 912 is not used for communication (are blanked), and a third set of resources 914 is used for UL communication.

A second deployment (e.g., communicating on channel 804) utilizes NR for communication as shown in timelines 904 and 904'. Timeline 904 represents communications by the second deployment where it aligns its transmissions with the first deployment, but does not blank out resources as discussed. In certain aspects, the slot length of the second deployment may be half that of the first deployment as shown (e.g., the second deployment is a 30 kHz deployment). As shown, resources 920 are used for communication of DL control information, resources 922 are used for DL data communication, resources 924 are blanked out or not utilized, resources 926 are used for communication of UL control information, and resources 928 are used for UL data communication. As shown, the DL/UL transmissions in timeline 904 are completely aligned with timeline 902, so there is not cross-link interference.

Time line 904' represents communications by the second deployment where it aligns its transmissions with the first deployment and blanks out resources, according to aspects described herein. In particular, as shown, time line 904' is similar to time line 904, except additional resources 924 are blanked out. Such resources 924 are not used by the second deployment for transmissions. The blanking out of such resources 924, as discussed, can be used to protect transmission of DL and/or UL control blocks including control information by deployments (e.g., NR deployments) operating in adjacent channel(s) to the second deployment.

Accordingly, the third deployment is free to utilize the blanked out resources 924 of the second deployment shown in time line 904' for other purposes (e.g., UL control transmission, DL control transmission, UL data transmission, and/or DL data transmission) providing scheduling flexibility in the third deployment. The third deployment (e.g., communicating on channel 806) utilizes NR for communication as shown in timeline 906. For example, as shown in subframe 950 (and similarly subframes 954-958), third deployment can utilize resources 926 for UL control information and resources 928 for UL data, even though subframe 950 is used for DL communication only in the first deployment and the second deployment. Further, since the second deployment and third deployment utilize NR, the third deployment may use resources 928 for UL data communication that are used for DL data communication in the second deployment (e.g., as shown in subframe 950), or may use resources 922 for DL data communication that are used for UL data communication in the third deployment (e.g., as shown in subframe 954) due to better cross-link interference mitigation in NR. However, the third deployment may only schedule communication of UL and/or DL control information that aligns with the same UL and/or DL control information as the second deployment, or that aligns with blanked out resources 924 of the second deployment as any additional interference in control information transmissions may lead to poor performance. Therefore, in certain aspects, the blanked out resources 924 on the second deployment are used only for UL control information transmission and/or DL control information transmission, and not for UL data transmission and/or DL data transmission.

In certain aspects, as discussed, a guard band may be utilized between first channel 802 and second channel 804 to prevent cross-link interference. Where the first deployment on channel 802 uses LTE, and the second deployment on channel 804 uses NR, and deployments on adjacent channels (e.g., channel 806) to channel 804 also use NR, the NR techniques for cross-link interference may be used between the channels used for NR, while the channel used for LTE is still protected by the guard band. In certain aspects, in order to limit the size (e.g., frequency range) of the guard band, a special sub-band may be used that is adjacent to the guard band. The sub-band may have certain restrictions that mitigate cross-link interference with the channel used for LTE.

Figure 10:
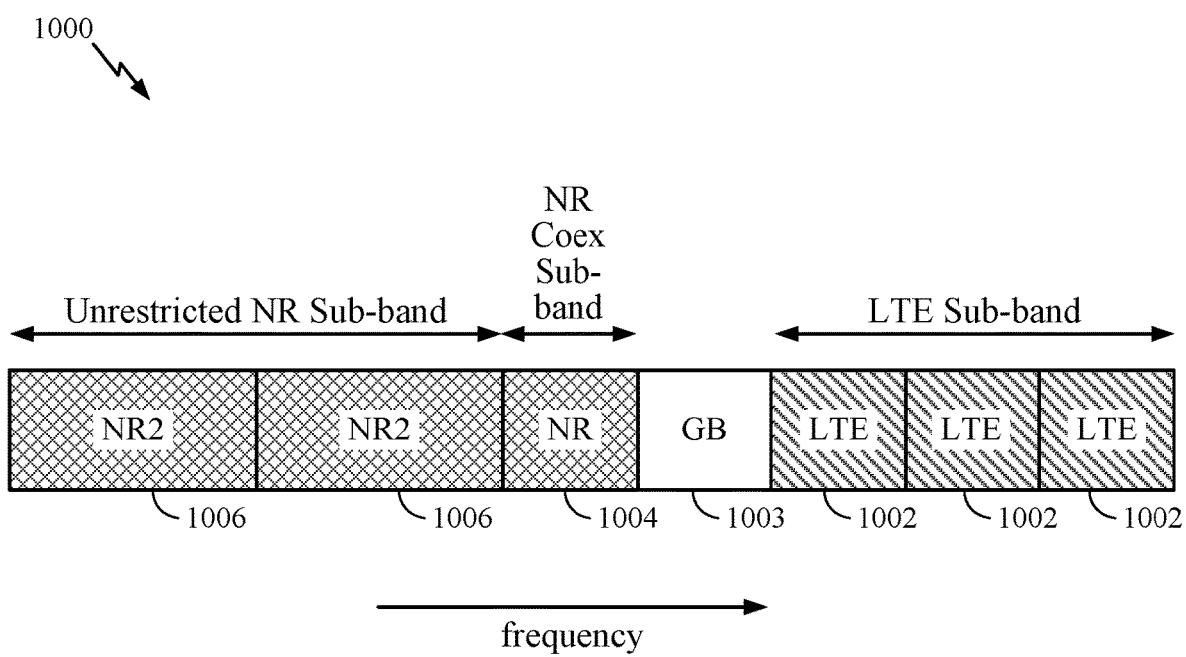
FIG. 10 illustrates adjacent channels of a frequency band for separate deployments, in accordance with aspects of the present disclosure.

For example, FIG. 10 illustrates adjacent channels of a frequency band for separate deployments. For example, frequency band 1000 is divided into first channel(s) 1002, a guard band 1003, a second channel 1004, and third channel(s) 1006. The first channels 1002 may be used for deployment(s) for a first RAT (e.g., LTE). The second channel 1004 may be used for deployment(s) for a second RAT (e.g., NR). The third channels 1006 may be used for deployment(s) for the second RAT as well.

In certain aspects, the second channel 1004 may be used as a special sub-band having restrictions that mitigate cross-link interference with the first channel(s) 1002 used for LTE. For example, the second channel 1004 may have a limited (e.g., smaller bandwidth). Since channel leakage of a waveform is proportional to the bandwidth of the waveform, the lower bandwidth transmissions on the second channel 1004 accordingly may have less leakage into adjacent channels. In certain aspects, the deployment(s) on second channel 1004 may align its transmission direction with the first channel(s) 1002 and also blank out certain resources such as according to the techniques discussed herein to mitigate cross link interference. In certain aspects, the deployment(s) on second channel 1004 may one or more of use a smaller bandwidth NR channel, use a sharper transmitter filter to reduce leakage to adjacent channels, use a sharper receiver filter to better block leakage from adjacent channels, use a lower transmit power for transmissions, or make sure BS antenna heights are lower so signal propagation is less causing less interference. In certain aspects, LTE deployments in the first channel 1002 adjacent to guard band 1003 may use similar restrictions.

Figure 11:
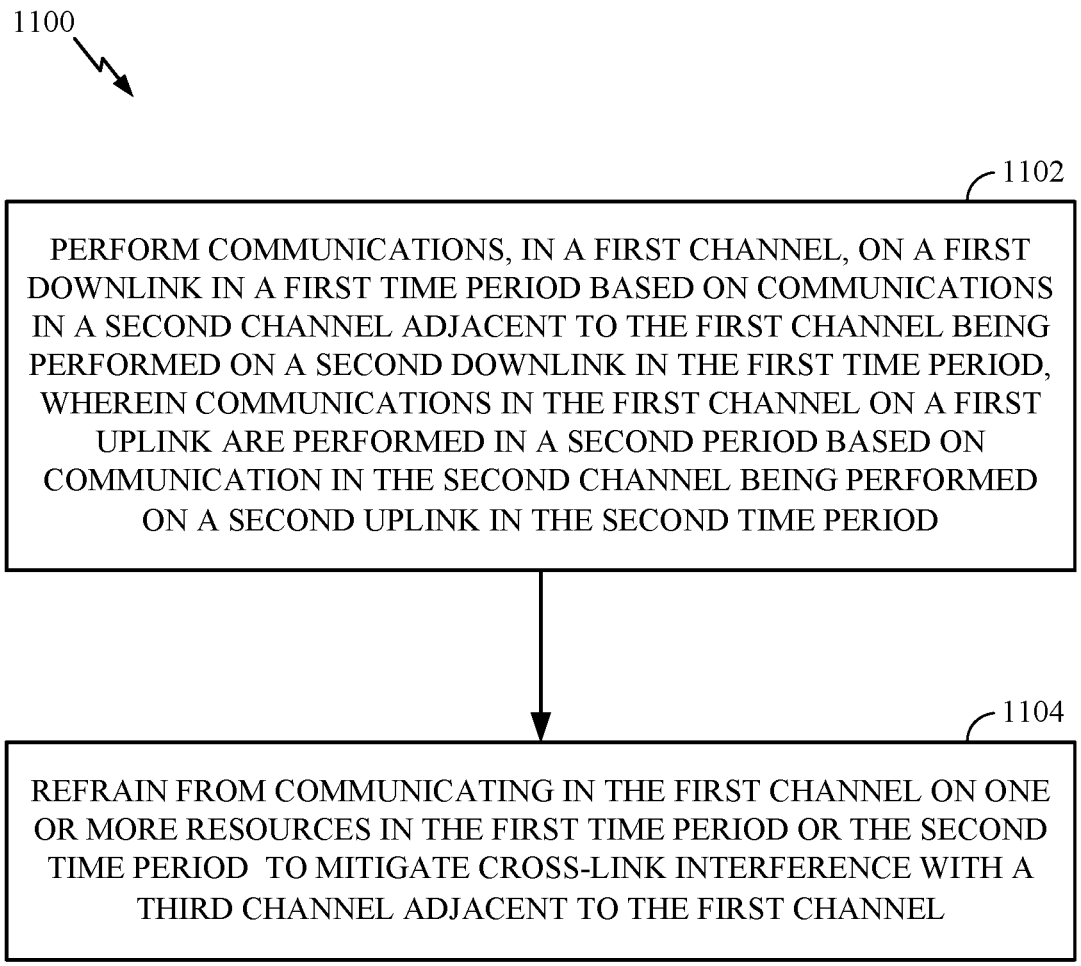
FIG. 11 illustrates example operations that may be performed by a wireless device for interference mitigation in accordance with aspects of the present disclosure.

FIG. 11 illustrates example operations that may be performed by a wireless device (e.g., BS 110/710 or UE 110/720) for interference mitigation in accordance with aspects of the present disclosure.

Operations 1100 begin, at 1102, by performing communications, in a first channel, on a first downlink in a first time period based on communications in a second channel adjacent to the first channel being performed on a second downlink in the first time period, wherein communications in the first channel on a first uplink are performed in a second period based on communication in the second channel being performed on a second uplink in the second time period. At 1104, operations 1100 continue by refraining from communicating in the first channel on one or more resources in the first time period or the second time period to mitigate cross-link interference with a third channel adjacent to the first channel.

FIG. 12 illustrates example operations that may be performed by a wireless device (e.g., 110/710 or UE 120/720) for interference mitigation in accordance with aspects of the present disclosure.

Operations 1200 begin, at 1202, by performing communications in a first channel, wherein the first channel is adjacent to a guard band, wherein the guard band is adjacent to a second channel used for LTE communication, wherein the first channel is further adjacent to a third channel used for NR communication, wherein communications in the first channel is restricted to mitigate cross-link interference between the first channel and the second channel, wherein restricting communications in the first channel comprises one or more of limiting a bandwidth of the first channel, using a sharp transmit filter, using a sharp receive filter, limiting transmit power, or limiting antenna height.

Figure 13:
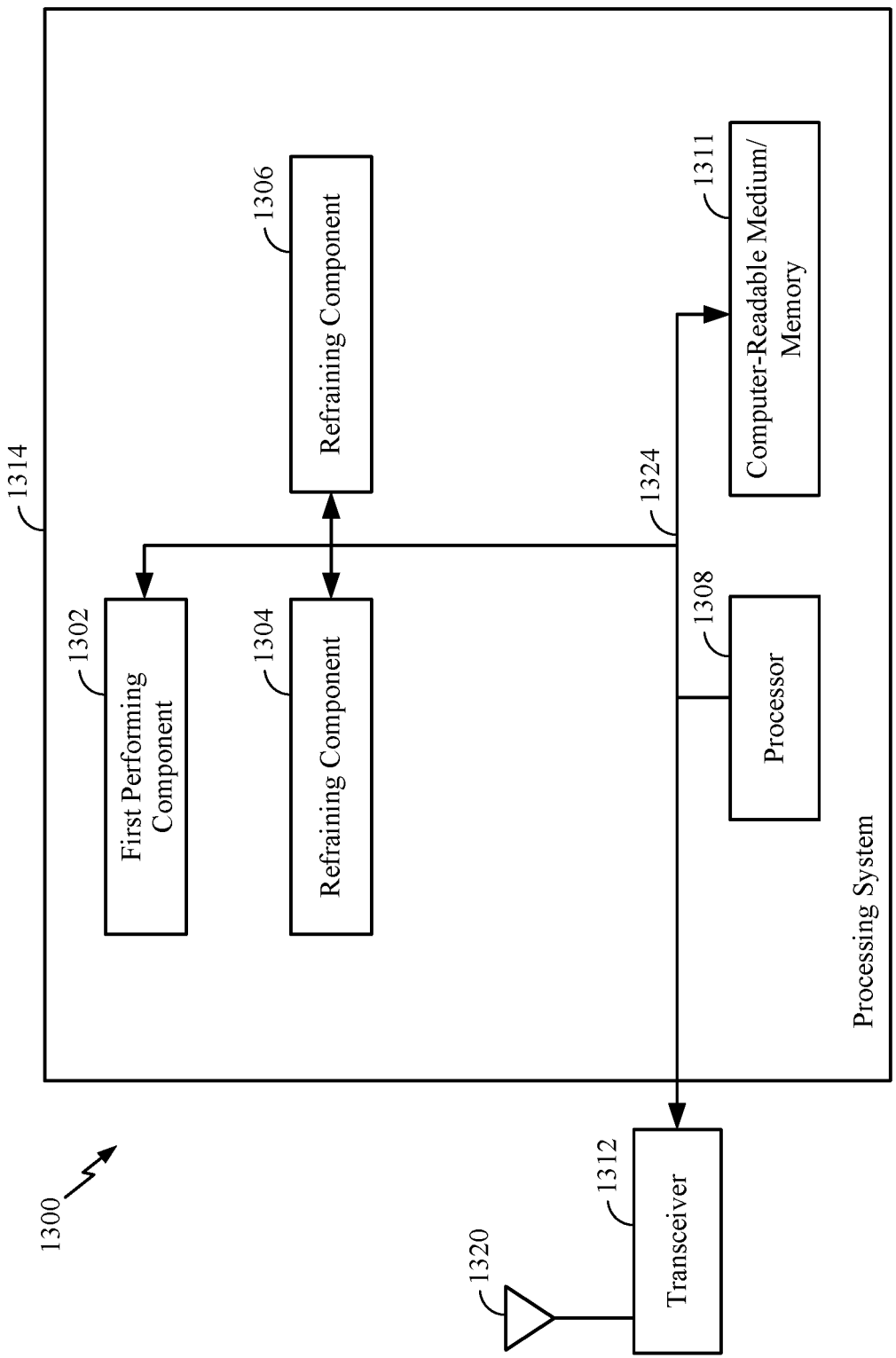
FIG. 13 illustrates a communications device that may include various components configured to perform operations for the techniques disclosed herein, in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 11 and/or 12. The communications device 1300 includes a processing system 1314 coupled to a transceiver 1312. The transceiver 1312 is configured to transmit and receive signals for the communications device 1300 via an antenna 1320, such as the various signal described herein. The processing system 1314 may be configured to perform processing functions for the communications device 1300, including processing signals received and/or to be transmitted by the communications device 1300.

The processing system 1314 includes a processor 1308 coupled to a computer-readable medium/memory 1311 via a bus 1324. In certain aspects, the computer-readable medium/memory 1311 is configured to store instructions that when executed by processor 1308, cause the processor 1308 to perform the operations illustrated in FIGS. 11 and/or 12, or other operations for performing the various techniques discussed herein.

In certain aspects, the processing system 1314 further includes a first performing component 1302 for performing the operations illustrated at 1102 in FIG. 11. Additionally, the processing system 1314 includes a refraining component 1304 for performing the operations illustrated at 1104 in FIG. 11. The processing system 1314 also includes a second performing component 1306 for performing the operations illustrated at 1202 in FIG. 12. The first performing component 1302, refraining component 1304, and second performing component 1306 may be coupled to the processor 1308 via bus 1324. In certain aspects, the first performing component 1302, refraining component 1304, and second performing component 1306 may be hardware circuits. In certain aspects, the first performing component 1302, refraining component 1304, and second performing component 1306 may be software components that are executed and run on processor 1308.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11 and 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, the method comprising:
    performing downlink communications, in a first channel, in a first time period and a third time period after the first time period that is adjacent in time to the first time period based on downlink communications in a second channel adjacent to the first channel being performed in the first time period and the third time period, wherein uplink communications in the first channel are performed in a second time period based on uplink communication in the second channel being performed in the second time period; and
    refraining from communicating in the first channel on one or more resources in the first time period to mitigate cross-link interference with a third channel adjacent to the first channel, the one or more resources in the first time period occurring in time after at least one resource in the first channel used for downlink communications in the first channel during the first time period.

2. The method of claim 1, wherein uplink communications in the third channel are performed during the one or more resources in the first time period.

3. The method of claim 2, wherein the uplink communications comprise uplink control information communication.

4. The method of claim 1, further comprising refraining from communicating in one or more resources in the second time period to mitigate cross-link interference with the third channel.

5. The method of claim 4, wherein downlink communications in the third channel are performed during the one or more resources in the second time period.

6. The method of claim 5, wherein the downlink communications comprise downlink control information communication.

7. The method of claim 1, wherein there is a guard band adjacent to the first channel and between the first channel and the second channel, wherein the second channel is used for LTE communication, wherein the first channel is used for NR communication, wherein communications in the first channel is restricted to mitigate cross-link interference between the first channel and the second channel, wherein restricting communications in the first channel comprises one or more of limiting a bandwidth of the first channel, using a sharp transmit filter, using a sharp receive filter, limiting transmit power, or limiting antenna height.

8. The method of claim 7, wherein communications in the second channel are also restricted.

9. A wireless communication device, comprising:
    a memory; and
    a processor configured to:
        perform downlink communications, in a first channel, in a first time period and a third time period after the first time period that is adjacent in time to the first time period based on downlink communications in a second channel adjacent to the first channel being performed in the first time period and the third time period, wherein unlink communications in the first channel are performed in a second time period based on uplink communication in the second channel being performed in the second time period; and
        refrain from communicating in the first channel on one or more resources in the first time period to mitigate cross-link interference with a third channel adjacent to the first channel, the one or more resources in the first time period occurring in time after at least one resource in the first channel used for downlink communications in the first channel during the first time period.

10. The wireless communication device of claim 9, wherein uplink communications in the third channel are performed during the one or more resources in the first time period.

11. The wireless communication device of claim 10, wherein the uplink communications comprise uplink control information communication.

12. The wireless communication device of claim 9, wherein the processor is further configured to refrain from communicating in one or more resources in the second time period to mitigate cross-link interference with the third channel.

13. The wireless communication device of claim 12, wherein downlink communications in the third channel are performed during the one or more resources in the second time period.

14. The wireless communication device of claim 13, wherein the downlink communications comprise downlink control information communication.

15. The wireless communication device of claim 9, wherein there is a guard band adjacent to the first channel and between the first channel and the second channel, wherein the second channel is used for LTE communication, wherein the first channel is used for NR communication, wherein communications in the first channel is restricted to mitigate cross-link interference between the first channel and the second channel, wherein restricting communications in the first channel comprises one or more of limiting a bandwidth of the first channel, using a sharp transmit filter, using a sharp receive filter, limiting transmit power, or limiting antenna height.

16. The wireless communication device of claim 15, wherein communications in the second channel are also restricted.

17. A wireless communication device, comprising:
means for performing downlink communications, in a first channel, in a first time period and a third time period after the first time period that is adjacent in time to the first time period based on downlink communications in a second channel adjacent to the first channel being performed in the first time period and the third time period, wherein uplink communications in the first channel are performed in a second time period based on uplink communication in the second channel being performed in the second time period; and
means for refraining from communicating in the first channel on one or more resources in the first time period to mitigate cross-link interference with a third channel adjacent to the first channel, the one or more resources in the first time period occurring in time after at least one resource in the first channel used for downlink communications in the first channel during the first time period.

18. The wireless communication device of claim 17, wherein uplink communications in the third channel are performed during the one or more resources in the first time period.

19. The wireless communication device of claim 18, wherein the uplink communications comprise uplink control information communication.

20. The wireless communication device of claim 17, further comprising means for refraining from communicating in one or more resources in the second time period to mitigate cross-link interference with the third channel.

21. The wireless communication device of claim 20, wherein downlink communications in the third channel are performed during the one or more resources in the second time period.

22. The wireless communication device of claim 21, wherein the downlink communications comprise downlink control information communication.

23. The wireless communication device of claim 17, wherein there is a guard band adjacent to the first channel and between the first channel and the second channel, wherein the second channel is used for LTE communication, wherein the first channel is used for NR communication, wherein communications in the first channel is restricted to mitigate cross-link interference between the first channel and the second channel, wherein restricting communications in the first channel comprises one or more of limiting a bandwidth of the first channel, using a sharp transmit filter, using a sharp receive filter, limiting transmit power, or limiting antenna height.

24. The wireless communication device of claim 23, wherein communications in the second channel are also restricted.

25. A non-transitory computer readable storage medium that stores instructions that when executed by a base station cause the base station to perform a method for wireless communication, the method comprising:
performing downlink communications, in a first channel, in a first time period and a third time period after the first time period that is adjacent in time to the first time period based on downlink communications in a second channel adjacent to the first channel being performed in the first time period and the third time period, wherein uplink communications in the first channel are performed in a second time period based on uplink communication in the second channel being performed in the second time period; and
refraining from communicating in the first channel on one or more resources in the first time period to mitigate cross-link interference with a third channel adjacent to the first channel, the one or more resources in the first time period occurring in time after at least one resource in the first channel used for downlink communications in the first channel during the first time period.

26. The non-transitory computer readable storage medium of claim 25, wherein uplink communications in the third channel are performed during the one or more resources in the first time period.

27. The non-transitory computer readable storage medium of claim 26, wherein the uplink communications comprise uplink control information communication.

28. The non-transitory computer readable storage medium of claim 25, the method further comprising refraining from communicating in one or more resources in the second time period to mitigate cross-link interference with the third channel.

29. The non-transitory computer readable storage medium of claim 28, wherein downlink communications in the third channel are performed during the one or more resources in the second time period.

* * * * *